United States Patent
Choy et al.

(10) Patent No.: US 9,336,566 B2
(45) Date of Patent: May 10, 2016

(54) IMAGE DEFORMATION METHOD AND APPARATUS USING DEFORMATION AXIS

(71) Applicant: Industry-Academic Cooperation Foundation, Yonsei University, Seoul (KR)

(72) Inventors: Yoon-Chul Choy, Seoul (KR); Eisung Sohn, Seoul (KR); Jae Woong Jeon, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 244 days.

(21) Appl. No.: 13/958,503

(22) Filed: Aug. 2, 2013

(65) Prior Publication Data

US 2014/0168270 A1 Jun. 19, 2014

(30) Foreign Application Priority Data

Dec. 14, 2012 (KR) .......................... 10-2012-0145990
Jul. 12, 2013 (KR) .......................... 10-2013-0081882

(51) Int. Cl.
*G06T 13/00* (2011.01)
*G06T 3/00* (2006.01)
*G06T 19/20* (2011.01)

(52) U.S. Cl.
CPC ............... *G06T 3/0093* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| 6,738,065 | B1 * | 5/2004 | Even-Zohar | ................... 345/473 |
| 2009/0002376 | A1 * | 1/2009 | Xu et al. | ................... 345/473 |
| 2011/0148874 | A1 * | 6/2011 | Cha et al. | ................... 345/420 |
| 2011/0208492 | A1 * | 8/2011 | Xu et al. | ................... 703/2 |
| 2014/0035901 | A1 * | 2/2014 | Chen et al. | ................... 345/419 |

OTHER PUBLICATIONS

Eisung Sohn et al., "Image Deformation Using Variational-Thickness Bone", HCI, 2012, pp. 411-412. Jan. 11, 2012. Translated by USPTO on Jun. 2015.*
Jacobson, Alec, et al. "Bounded biharmonic weights for real-time deformation." ACM Trans. Graph. 30.4 (2011): 78.*
Sumner, Robert W., Johannes Schmid, and Mark Pauly. "Embedded deformation for shape manipulation." ACM Transactions on Graphics (TOG)26.3 (2007): 80.*

(Continued)

*Primary Examiner* — Tize Ma
*Assistant Examiner* — Yu Chen

(57) ABSTRACT

The present invention relates to an image deformation method. An image deformation method using a deformation axis according to the present invention includes deforming the deformation axis based on deformation energy of points according to a deformation of at least one deformation axis including a plurality of points predetermined with respect to an image to be deformed; and deforming the image using a plurality of segments of the deformation axis divided based on points of the deformed deformation axis. According to the present invention, an image deformation method using a deformation axis is performed based on a freeform deformation axis (FDA) that is independent from a type of an original object and thus, may be more advantageous and may be utilized in combination with various types of deformation methods. Deformation of an image may be performed intuitively and in real time and thus, may be easily used by general users.

23 Claims, 10 Drawing Sheets
(1 of 10 Drawing Sheet(s) Filed in Color)

(56) References Cited

OTHER PUBLICATIONS

Yan, Han-Bing, et al. "Shape deformation using a skeleton to drive simplex transformations." Visualization and Computer Graphics, IEEE Transactions on 14.3 (2008): 693-706.*

HCI 2012 web site print out for HCI Korea 2012 conference date.*

J.P. Lewis et al., "Pose Space Deformation: A Unified Approach to Shape Interpolation and Skeleton-Driven Deformation", Proceedings of the 27th Annual Conference on Computer Graphics and Interactive Techniques (Siggraph '00), 2000, pp. 165-172.

George Celniker et al., "Deformable Curve and Surface Finite-Elements for Free-Form Shape Design", Computer Graphics, Jul. 1991, pp. 257-266, vol. 25, No. 4.

Mario Botsch et al., "On Linear Variational Surface Deformation Methods", IEEE Transactions on Visualization and Computer Graphics, Jan./Feb. 2008, pp. 213-230, vol. 14, No. 1, IEEE Computer Society.

Yanlin Weng et al., "2D shape deformation using nonlinear least squares optimization", Visual Comput, Aug. 24, 2006, pp. 653-660, DOI 10.1007/s00371-006-0054-y.

Eisung Sohn et al., "Image Deformation Using Variational-Thickness Bone", HCI, 2012, pp. 411-412, Jan. 11, 2012.

* cited by examiner 510   520   530   540

IMAGE DEFORMATION METHOD AND APPARATUS USING DEFORMATION AXIS

CROSS-REFERENCE TO RELATED APPLICATIONS

This application claims priority to and the benefit of Korean Patent Application Nos. 10-2012-0145990 and 10-2013-0081882 filed in the Korean Intellectual Property Office on Dec. 14, 2012 and Jul. 12, 2013, the entire contents of which are incorporated herein by reference.

TECHNICAL FIELD

The present invention relates to an image deformation method, and more particularly, to a method of correcting an image by deforming a shape and thereby advancing to creating an animation.

BACKGROUND ART

A method of using a skeleton is most well known as a method of deforming a two-dimensional (2D) image or a three-dimensional (3D) image. The method of using a skeleton is suitable for creating an animation due to an easy execution method and a simple calculation, but has difficulty in obtaining a skeleton structure of an image and also has difficulty in being accessed by a general user.

As another method, a freeform deformation (FFD) method is performed through deforming a space including a shape to be deformed. However, in this case, many control points are required and a method of using a physics based simulation requires a relatively large amount of calculation.

Currently, many researches to solve a shape deformation issue by concluding the shape deformation issue as an energy minimization issue are being conducted through a geometrical approach, but a linearity of a proposed algorithm or a processing rate and stability still remain as an issue.

SUMMARY OF THE INVENTION

The present invention has been made in an effort to provide an intuitive image deformation method to a user. More particularly, an exemplary embodiment proposes a method of deforming an image based on a freeform deformation axis (FDA).

An exemplary embodiment of the present invention provides an image deformation method using a deformation axis, the method including: deforming the deformation axis based on deformation energy of points according to a deformation of at least one deformation axis including a plurality of points predetermined with respect to an image to be deformed; and deforming the image using a plurality of segments of the deformation axis divided based on points of the deformed deformation axis.

The deforming of the deformation axis may deform the deformation axis based on the deformation energy of points calculated using a length of a segment of the deformation axis divided based on the plurality of points.

The deforming of the deformation axis may deform the deformation axis based on the deformation energy of points calculated using Laplacian coordinates about the plurality of points.

The deforming of the deformation axis may deform the deformation axis to minimize the deformation energy of points in the case of deforming the image.

The image deformation method using the formation axis may further include generating an intermediate shape that is figures formed along the deformation axis and surrounding a portion of the deformation axis. The deforming of the image may deform the image by deforming the intermediate shape.

The intermediate shape may be configured as a plurality of offset curves having a predetermined interval with respect to the deformation axis.

The intermediate shape may include a plurality of offset points that is positioned on a normal line with respect to the plurality of segments of the deformation axis and has a predetermined interval.

The deforming of the image may deform the intermediate shape based on a before-deformation width and an after-deformation width of the intermediate shape.

The deforming of the image may determine a thickness of the intermediate shape that is deformed based on a change in a length of a segment of the deformation axis according to the deformation of the intermediate shape.

The deformation of the image may be performed based on a change in a position of a rotation control point using a fixing control point or the rotation control point set with respect to the deformation axis.

The deforming of the image may deform the image using a linear blend skinning (LBS) weight assigned to each segment of the deformation axis with respect to each point of the image.

The image deformation method using the formation axis may further include assigning the LBS weight to each segment of the deformation axis with respect to each point of the image.

The assigning of the LBS weight may assign the LBS weight using a bounded biharmonic weights (BBW) scheme.

Another exemplary embodiment of the present invention provides an image deformation method using a deformation axis, the method including: receiving, from a user, a reference axis that is a reference of image deformation; deforming the deformation axis based on deformation energy of points in the case of deforming the deformation axis including a plurality of points predetermined with respect to an image according to the reference axis; and deforming the image using a plurality of segments of the deformation axis divided based on points of the deformed deformation axis.

Still another exemplary embodiment of the present invention provides an image deformation apparatus using a deformation axis, the apparatus including: an intermediate shape generator configured to generate an intermediate shape that is figures formed along at least one deformation axis including a plurality of points predetermined with respect to an image to be deformed, and surrounding a portion of the deformation axis; a deformation axis deformer configured to deform the deformation axis based on deformation energy of the points according to the deformation of the deformation axis; and an image deformer configured to deform the image through deforming the intermediate shape using a plurality of segments of the deformation axis divided based on points of the deformed deformation axis.

Yet another exemplary embodiment of the present invention provides an image deformation apparatus using a deformation axis, the apparatus including: a deformation axis deformer configured to deform the deformation axis based on deformation energy of points according to deformation of at least one deformation axis including a plurality of points predetermined with respect to an image to be deformed; and an image deformer configured to deform the image using a plurality of segments of the deformation axis divided based on points of the deformed deformation axis.

The image deformer may deform the image using an LBS weight assigned to each segment of the deformation axis with respect to each point of the image.

The image deformation apparatus using the formation axis may further include an LBS weight assigner configured to assign the LBS weight to each segment of the deformation axis with respect to each point of the image.

The LBS weight assigner may assign the LBS weight using a BBW scheme.

According to exemplary embodiments of the present invention, an image deformation method using a deformation axis is performed based on a freeform deformation axis (FDA) that is independent from a type of an original object and thus, may be more advantageous and may be utilized in combination with various types of existing deformation methods. Deformation of an image may be performed intuitively with small calculation cost and in real time and thus, may be easily used by general users The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
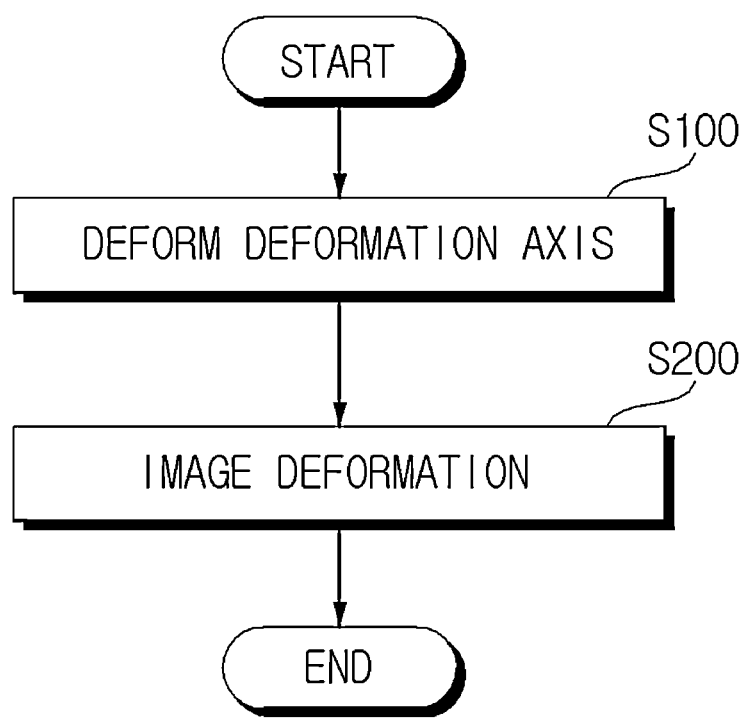
FIG. 1 is a flowchart illustrating an image deformation method using a deformation axis according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following description simply exemplifies a principle of the invention. Accordingly, even though not clearly described or illustrated in the present specification, those skilled in the art may configure the principle of the invention and may invent a variety of apparatuses included in the concept and scope of the invention. All of the conditional terminologies and exemplary embodiments enumerated in the present specification are clearly intended only for the purpose of understanding the concept of the invention, in principle. Accordingly, the invention should not be understood to be limited to the exemplary embodiments and states particularly enumerated as above.

The aforementioned objects, features, and advantages will become further obvious through the following detailed description which is associated with the accompanying drawings and accordingly, those skilled in the art may easily implement the technical spirit of the invention. When it is determined that the detailed description related to a related known function or configuration may make the purpose of the present invention unnecessarily ambiguous in describing the invention, the detailed description will be omitted herein. Hereinafter, exemplary embodiments of the present invention will be described in detail with reference to the accompanying drawings.

FIG. 1 is a flowchart illustrating an image deformation method using a deformation axis according to an exemplary embodiment of the present invention. Referring to FIG. 1, the image deformation method according to the present exemplary embodiment includes an operation of deforming a deformation axis S100 and an image deformation operation S200.

In the case of deforming an image, the operation of deforming the deformation axis S100 deforms the deformation axis based on deformation energy of points according to deformation of at least one deformation axis including a plurality of points predetermined with respect to the image.

In the present exemplary embodiment, the deformation axis (freeform deformation axis (FDA)) is an axis that is a reference of deformation of the image desired to be deformed, and may be determined based on an input of a user or according to a predetermined algorithm, and may be formed as a curve having various thicknesses. The deformation axis may be determined based on a freeform drawn by the user and may be determined to be approximate to a central axis of an object.

An image deformation method according to an exemplary embodiment of the present invention is performed through deforming a called intermediate shape that uses the deformation axis as an axis through deformation of the deformation axis, instead of deforming an image of an actual object. The intermediate shape indicates figures that are formed along the deformation axis and surround a portion of the deformation axis. The intermediate shape may have various thickness values according to the deformation axis, and the intermediate shape is deformed based on the deformation axis.

Figure 3:
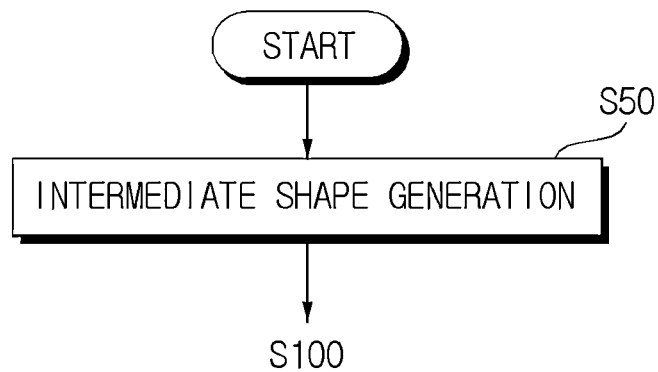
FIG. 3 is a flowchart illustrating an intermediate shape generation operation in the image deformation method using the deformation axis according to an exemplary embodiment of the present invention.

Accordingly, referring to FIG. 3, the image deformation method according to the present exemplary embodiment may further include an intermediate shape generation operation S50.

As described above, the intermediate shape generation operation S50 generates the intermediate shape that uses the deformation axis as the axis, and the image deformation operation S200 deforms the image through deforming the intermediate shape.

Figure 4:
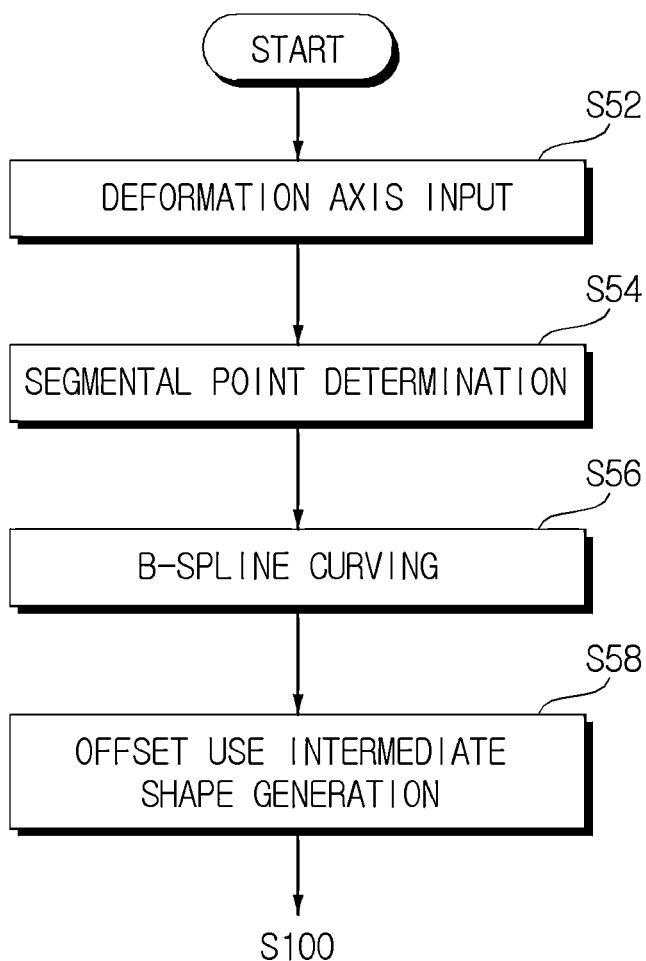
FIG. 4 is a flowchart illustrating in detail an intermediate shape generation operation in the image deformation method using the deformation axis according to an exemplary embodiment of the present invention.

Further describing in detail the intermediate shape generation operation S50 with reference to FIG. 4, the intermediate shape generation operation S50 according to the present exemplary embodiment includes a deformation axis input operation S52, a segmental point determination operation S54, a B-spline curving operation S56, and an offset use intermediate shape generation operation S58.

The deformation axis input operation S52 receives an axis that is a reference of deformation with respect to an object image by the user or receives, as the deformation axis, a central axis that is extracted according to a predetermined algorithm, for example, an algorithm of extracting a central axis of the object image.

The segmental point determination operation S54 determines segmental points with respect to the received deformation axis. The segmental points are positioned on the determined deformation axis and have a predetermined interval. Further detail segmentation for deformation of the image may be performed at intervals of the segmental points, and an amount of calculation for the image deformation may be adjusted. The segmental points may be formed at identical intervals, or may be formed at various intervals based on a curvature of the deformation axis or a property of the object.

The B-spline curving operation S56 forms a curve using the determined segmental points. A B-spline curve is in a smooth shape compared to a Hermite curve or a Bezier curve and is a curve defined so that a primary derived function and a secondary derived function of both end points may continue when three-dimensionally indicating a curve. In the present exemplary embodiment, the B-spline curve forms a mixed divisional polynomial curve based on the segmental points. That is, in the present exemplary embodiment, the deformation axis may be obtained by deforming the received deformation axis to a spline curve in a further smooth shape according to an input of the user or the predetermined algorithm through the B-spline curving operation S56.

The offset use intermediate shape generation operation S58 generates the intermediate shape through a plurality of points or lines having a predetermined interval with respect to the curve determined in the B-spline curving operation S56.

In the present exemplary embodiment, the offset use intermediate shape generation operation S58 may form the intermediate shape to be in a rectangular grating according to the deformation axis. That is, each of the points of the deformation axis has a predetermined interval and has an offset point positioned on a normal line with respect to each segment divided based on segmental points of the deformation axis. The offset use intermediate shape generation operation S58 may generate, as the intermediate shape, the rectangular grating configured using a line that connects each offset point.

The offset use intermediate shape generation operation S58 may generate the intermediate shape through two offset curves having a predetermined interval with respect to the deformation axis. An offset curve may be defined using two parameters. A smooth curve with respect to both sides of the deformation axis may be obtained based on a distance from the deformation axis and a distance along the deformation axis. The offset use intermediate shape generation operation S58 generates the intermediate shape of a mesh structure through offset curves of both sides.

Figure 5:
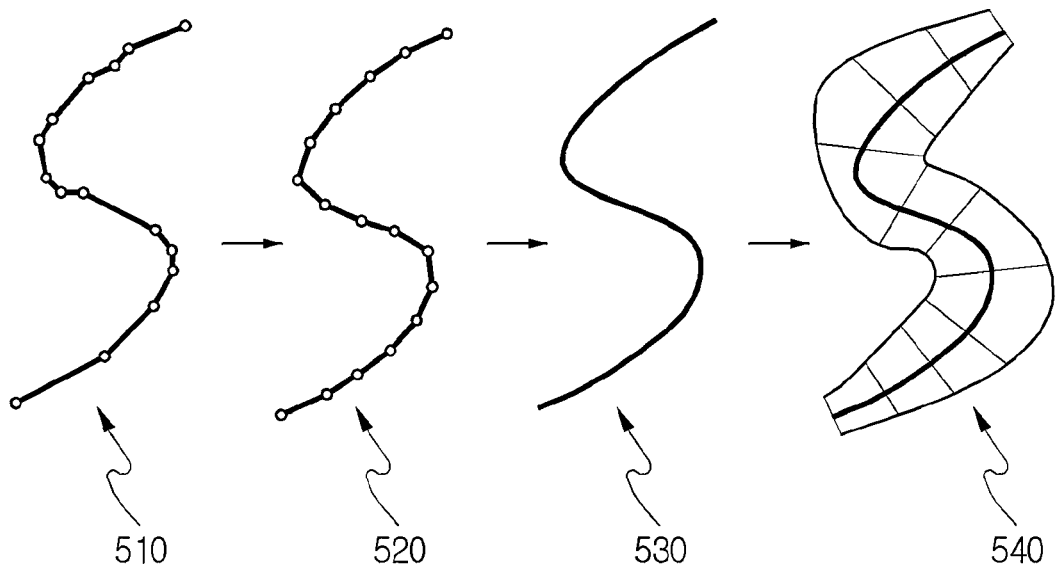
FIG. 5 is an exemplary diagram illustrating an example of generating the intermediate shape in the image deformation method using the deformation axis according to an exemplary embodiment of the present invention.

Describing with reference to FIG. 5, the intermediate shape generation operation S50 according to the present exemplary embodiment receives a deformation axis drawn by a user (510), and determines segmental points with respect to the received deformation axis (520).

The intermediate shape generation operation S50 generates a B-spline curve using the determined segmental points (530) and generates an intermediate shape using a predetermined offset by using the generated B-spline curve as the deformation axis (540).

Figure 2:
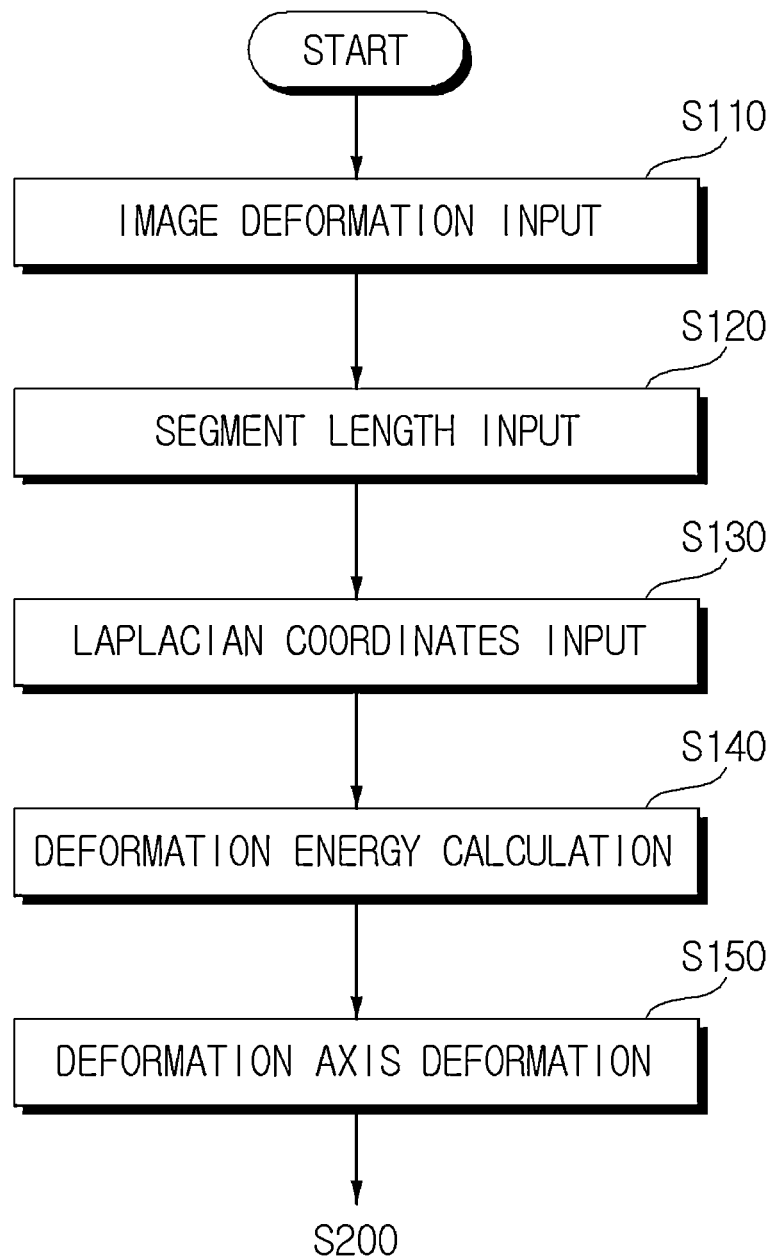
FIG. 2 is a flowchart illustrating in detail an operation of deforming the deformation axis in the image deformation method using the deformation axis according to an exemplary embodiment of the present invention.

Hereinafter, the operation of deforming the deformation axis S100 will be further described with reference to FIG. 2. Referring to FIG. 2, in the present exemplary embodiment, the operation of deforming the deformation axis S100 includes an image deformation input operation S110, a segment length input operation S120, a Laplacian coordinates input operation S130, a deformation energy calculation operation S140, and a deformation axis deformation operation S150.

The image deformation input operation S110 is an operation of receiving deformation of an image desired to be deformed by the user. In the present exemplary embodiment, as described above, the image deformation input operation S110 generates the intermediate shape that uses the deformation axis as an axis, and the image deformation operation S200 deforms the image through deforming the intermediate shape and thus, receives deformation of the deformation axis formed in the intermediate shape generation operation S50.

The intermediate shape includes a contour of a target image desired to be deformed and is a further simplified image. Accordingly, in the present exemplary embodiment, to deform the image through deforming the intermediate shape indicates to deform the intermediate shape in correspondence to the target image.

Figure 8:
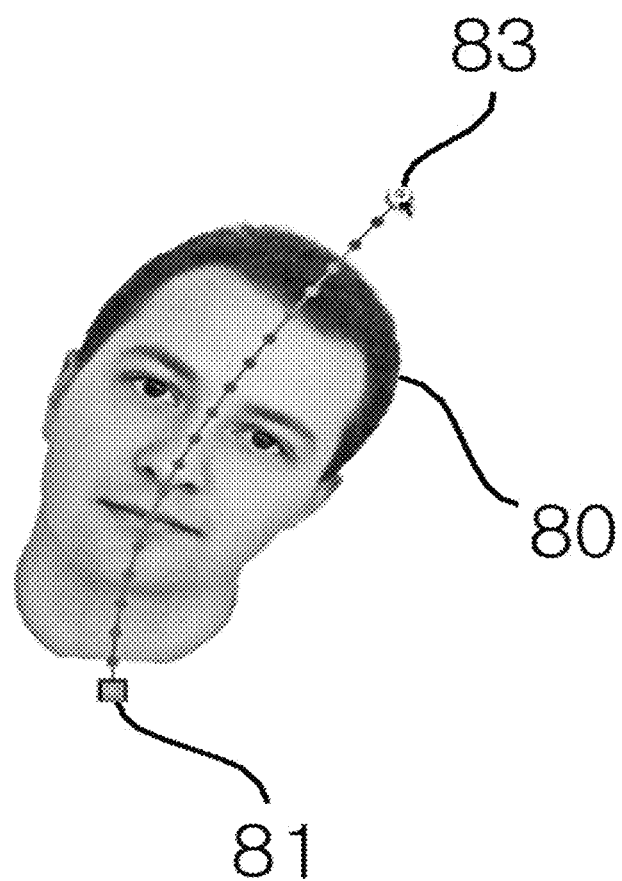
FIGS. 8 through 10 are exemplary diagrams illustrating an example of the image deformation method using the deformation axis according to an exemplary embodiment of the present invention.

Referring to FIG. 8, in the present exemplary embodiment, the deformation of the image may be performed based on control points set with respect to the deformation axis. The control points may include a fixing control point to limit a position/rotation and a rotation control point to limit only a position. In the present exemplary embodiment, the image deformation may be performed through the fixing control point and the rotation control point. That is, the image deformation input operation S110 inputs a deformation 80 of the image by selecting and moving a rotation control point 83 that the user desires to deform with respect to a fixing control point 81 set with respect to an axis.

The image deformation method according to the present exemplary embodiment uses, as an input, x and y coordinates about points of the deformation axis and uses, as an output, x and y coordinates about a position of a rotation control point that minimizes distortion of a curve. A curve of the deformation axis may be represented as a graph (V, E). Here, V denotes a set of n points and E denotes set of m segments that are divided into points.

As described above, the image deformation method according to the present exemplary embodiment is based on minimizing deformation energy according to deformation of an image. In minimizing energy, image deformation is performed through minimizing deformation energy of the deformation axis and thus, is simple compared to other methods of considering the overall deformation energy of the image. In the present exemplary embodiment, the deformation energy according to the deformation of the deformation axis may be calculated based on a segment length and Laplacian coordinates.

Therefore, the operation of deforming the deformation axis S100 according to the present exemplary embodiment deforms the deformation axis based on deformation energy of points calculated using a length of a segment of the deformation axis divided based on a plurality of points and Laplacian coordinates about the plurality of points. The deformation axis may be deformed to minimize the deformation energy of points in the case of deforming the image. Hereinafter, each operation for calculating the deformation energy will be further described in detail.

The segment length input operation S120 receives the length of the segment divided based on the plurality of points of the aforementioned deformation axis. The operation of deforming the deformation axis S100 according to the present exemplary embodiment is to maintain a length of each segment during the deformation and the length of each segment may be expressed as Equation 1.

$$\sum_{(i,j)\in E} |||v_i - v_j| - |v_i^0 - v_j^0|||^2 \qquad \text{[Equation 1]}$$

Here, $v^0$ denotes coordinates of a point before deformation and v denotes coordinates of a point on a curve of the deformation (matrix) after deformation.

Equation 1 may be expressed again as Equation 2.

$$\sum_{(i,j)\in E} ||(v_i - v_j) - e(v_i, v_j)||^2 \qquad \text{[Equation 2]}$$

Here, $$e(v_i, v_j) = \frac{\tilde{l}_{i,j}}{l_{i,j}}(v_i - v_j),$$

$\tilde{l}_{i,j}$ denotes a length of a segment (i, j) before deformation, and $l_{i,j}$ denotes a length of a segment after deformation.

Equation 2 may be expressed in a form of a matrix as Equation 3.

$$||HV - e(V)||^2 \qquad \text{[Equation 3]}$$

Here, H denotes an m×n matrix.

Therefore, the segment length input operation S120 according to the present exemplary embodiment receives a calculation result of the segment length according to the aforementioned equation.

The Laplacian coordinates input operation S130 receives Laplacian coordinates of the deformation axis.

Laplacian coordinates $\delta_i$ about each point $v_i$ is expressed through a difference between the point $v_i$ and the average coordinates of neighboring points thereof.

That is, the Laplacian coordinates are expressed as Equation 4.

$$\mathcal{L}(v'_i) = v'_i - (v'_{i-1} + v'_{i+1})/2 \qquad \text{[Equation 4]}$$

Here, $v'_{i-1}$ and $v'_{i+1}$ denote neighboring points of the point $v_i$ and L denotes an Laplacian operator. It indicates a position of a point between neighboring points. The operation of deforming the deformation axis S100 according to the present exemplary embodiment is to maintain Laplacian coordinates during the deformation and the deformation energy may be expressed as Equation 5.

$$\sum_{i \in V} ||\mathcal{L}(v'_i) - \delta_i||^2 \qquad \text{[Equation 5]}$$

Here, $\delta_i$ denotes Laplacian coordinates about the point $v_i$ and $\delta_i = v_i - (v'_{i-1} v'_{i+1})/2$. Equation 5 may be expressed in a form of a matrix as shown in Equation 6.

$$||LV - \delta(V)||^2 \qquad \text{[Equation 6]}$$

Here, V includes a position about each of points on the deformation axis and L denotes an (m−1)×n Laplacian matrix. δ denotes a vector on the Laplacian coordinates.

Therefore, the Laplacian coordinates input operation S130 according to the present exemplary embodiment receives Laplacian coordinates about each of points according to the aforementioned equation.

The deformation energy calculation operation S140 calculates deformation energy of the deformation axis using the received segment length and Laplacian coordinates. To control the image deformation according to the present exemplary embodiment, a condition for limiting a position of a point and a segment length may be assigned. The deformation energy according to the position deformation of all of the points on the deformation axis according to the present exemplary embodiment to which the above condition is applied is expressed as shown in Equation 7.

$$w_e||HV - e(V)||^2 + w_l||LV - \delta(V)||^2 + w_p||C_p V - U||^2 + w_e||C_e V - W||^2 \qquad \text{[Equation 7]}$$

Here, $||C_p V - U||$ denotes an item for limiting the position of the point. In this instance, $C_p$ denotes a point-indexing matrix for limiting the position and U includes target positions of points.

$||C_e V - W||$ denotes an item for limiting the segment length. In this instance, $C_e$ denotes a point-indexing matrix for limiting the segment length and W denotes a position of a target segment.

$w_e$ denotes a weight about the segment length and $w_l$ denotes a weight about Laplacian coordinates. $w_p$ denotes a weight about a position. The deformation energy calculation operation S140 calculates a deformation position about all of the points through minimizing a sum of deformation energies of Equation 7.

According to an exemplary embodiment of the present invention, weights of Equation 7 may be variable. In particular, the weight $w_l$ about Laplacian coordinates may be variable according to Laplacian coordinates. Here, according to an increase in the weight $w_l$, a position of a point corresponding to the corresponding Laplacian coordinates is relatively less deformed. According to a decrease in the weight $w_l$, a position of a point corresponding to the corresponding Laplacian coordinates is relatively greatly deformed. Accordingly, as a result, in the deformation axis, a portion corresponding to the great weight $w_l$ is relatively less bent and a portion corresponding to the small $w_l$ is relatively greatly bent.

Meanwhile, Equation 7 may be reconverted in a form of Equation 8.

$$\min \|AV - b(V)\|^2 \qquad \text{[Equation 8]}$$

Here, $$A = \begin{pmatrix} w_e H \\ w_l L \\ w_p C_p \\ w_e C_e \end{pmatrix}, \quad b(V) = \begin{pmatrix} w_e e(V) \\ w_l \delta(V) \\ w_p U \\ w_e W \end{pmatrix}.$$

In the present exemplary embodiment, the deformation energy is a nonlinear least square method and b is dependent to V and a matrix is dependent only to an initial shape. In the present exemplary embodiment, an energy minimization issue may be solved using a repetitive Gauss Newton method.

To use the repetitive Gauss Newton method, Equation 7 may be expressed as Equation 9.

$$\min_{V^{k+1}} \|AV^{k+1} - b(V^k)\|^2 \qquad \text{[Equation 9]}$$

$V^k$ denotes coordinates of a point through k repetitions and $V^{k+1}$ denotes coordinates desired to be obtained through subsequent repetition.

Equation 9 is provided in a form of a standard linear least square method and a solution thereof is given by Equation 10.

$$V^{k+1} = (A^T A)^{-1} A^T b(V^k) \qquad \text{[Equation 10]}$$

Equation 10 may be expressed again as Equation 11.

$$V^{k+1} = Gb(V^k) \qquad \text{[Equation 11]}$$

Here, $G=(A^T A)^{-1} A^T$ and may be expressed again as Equation 12. As described above, A may be dependent only to the initial shape and G may be recalculated before deformation.

In repetitive execution, b is calculated through coordinates $V^k$ of a point calculated through a previous repetition. Accordingly, only $\delta(V^k)$ and $e(V^k)$ need to be calculated for each repetition.

$e(V^k)$ may be calculated through the following Equation 12.

$$e(v_i^k, v_j^k) = \frac{\tilde{l}_{i,j}}{|v_i^k - v_j^k|}(v_i^k - v_j^k), \text{ for } (i, j) \in E \qquad \text{[Equation 12]}$$

To calculate Laplacian coordinates $\delta(V^k)$, initial Laplacian coordinates are required. When deformation is absent in a difference between a plurality of sets of coordinates, a deformation energy item for a simple rotation of the object needs to be "0, but deformation energy for instantaneous calculation is not "0" and $v_i$ belonging to V is rotatable. Here, Laplacian coordinates $\delta(V^k)$ about $v_i$ are expressed as Equation 13.

$$\delta(v_i^k) = R_i^k \delta(v_i^0) \qquad \text{[Equation 13]}$$

Here, $\delta(v_i^0)$ denotes initial Laplacian coordinates and $R_i^k$ is calculated through a minimization process of the following Equation 14.

$$R_i^k = \operatorname*{argmin}_{R_i^k} \sum_{(i,j) \in E} \|R_i^k(v_j^0 - v_i^0) - (v_j^k - v_i^k)\|^2 \qquad \text{[Equation 14]}$$

The deformation with the minimum deformation energy is performed through a process of differentiating all of the coefficients of $R_i^k$ and making a sum thereof become "0". Equation 14 may be deformed to Equation 15.

$$R_i^k = \sum_{(i,j) \in E} (v_j^k - v_i^k)(v_j^0 - v_i^0)^T D_i \qquad \text{[Equation 15]}$$

Here, $D_i = \left( \sum_{(i,j) \in E} (v_j^0 - v_i^0)(v_j^0 - v_i^0)^T \right)^{-1}$ and may be calculated in advance.

The operation of deforming the deformation axis S100 according to the aforementioned present exemplary embodiment calculates the deformation energy of all of the points on the deformation axis through the aforementioned process (S140) and deforms the deformation axis by determining a position for minimizing the deformation energy (S150).

Hereinafter, the operation of deforming the image using the deformed deformation axis (S200) will be described.

The image deformation operation S200 deforms the image using a plurality of segments of the deformation axis divided based on points of the deformed deformation axis. That is, the image deformation operation S200 deforms an intermediate shape based on a before-deformation width and an after-deformation width of the intermediate shape.

Figure 6:
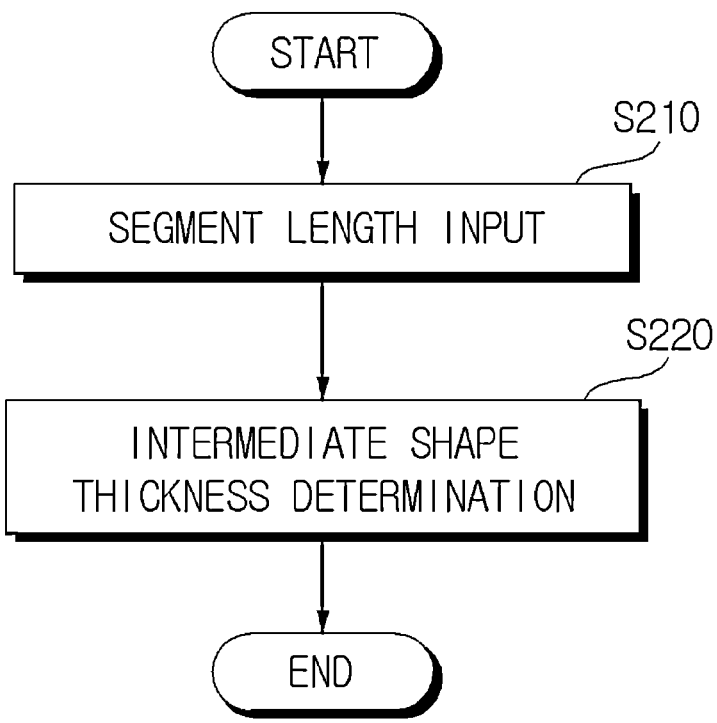
FIG. 6 is a flowchart illustrating in detail an image deformation operation in the image deformation method using the deformation axis according to an exemplary embodiment of the present invention.

Referring to FIG. 6, the image deformation operation S200 includes a segment length input operation S210 and an intermediate shape thickness determination operation S220. The segment length input operation S210 receives lengths of a plurality of segments of the deformation axis divided based on points of the deformed deformation axis.

Figure 7:
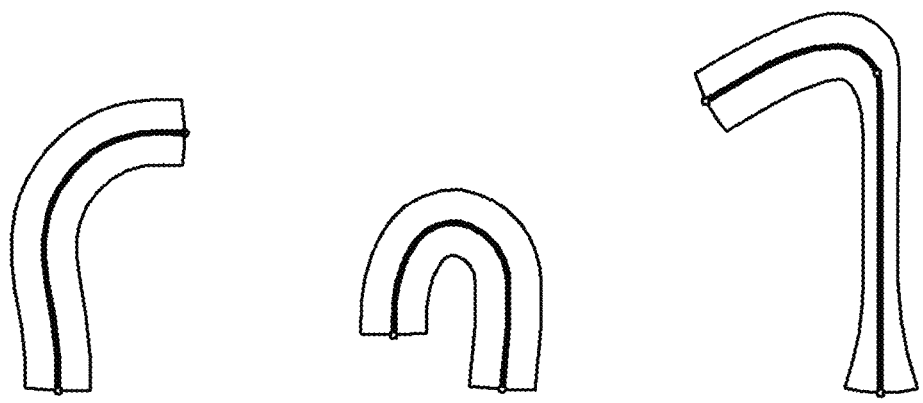
FIG. 7 is an exemplary diagram illustrating an example of deforming an image in the image deformation method using the deformation axis according to an exemplary embodiment of the present invention.

Referring to FIG. 7, the intermediate shape thickness determination operation S220 compares the received length of after-deformation segment and length of before-deformation segment and increases a thickness of the intermediate shape when the length of segment is decreased, and decreases the thickness when the length of segment is increased. That is, to consider the before-deformation width and the after-deformation width of the intermediate shape in the present exemplary embodiment is to maintain widths of the deformed intermediate shape and an original intermediate shape, and the thickness is determined based on a change in the length of the segment of the deformation axis.

Figure 9:
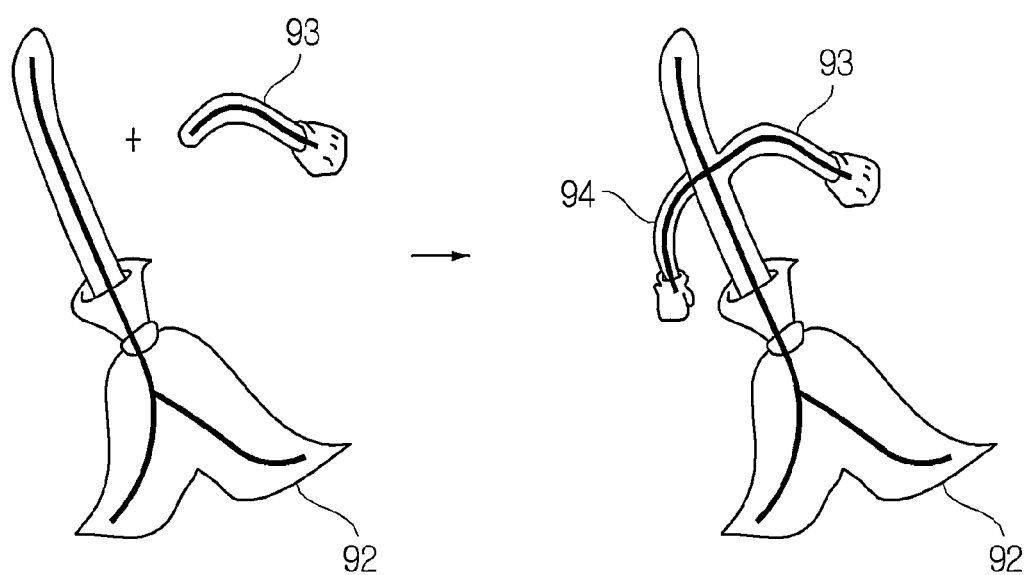
Figure 10:
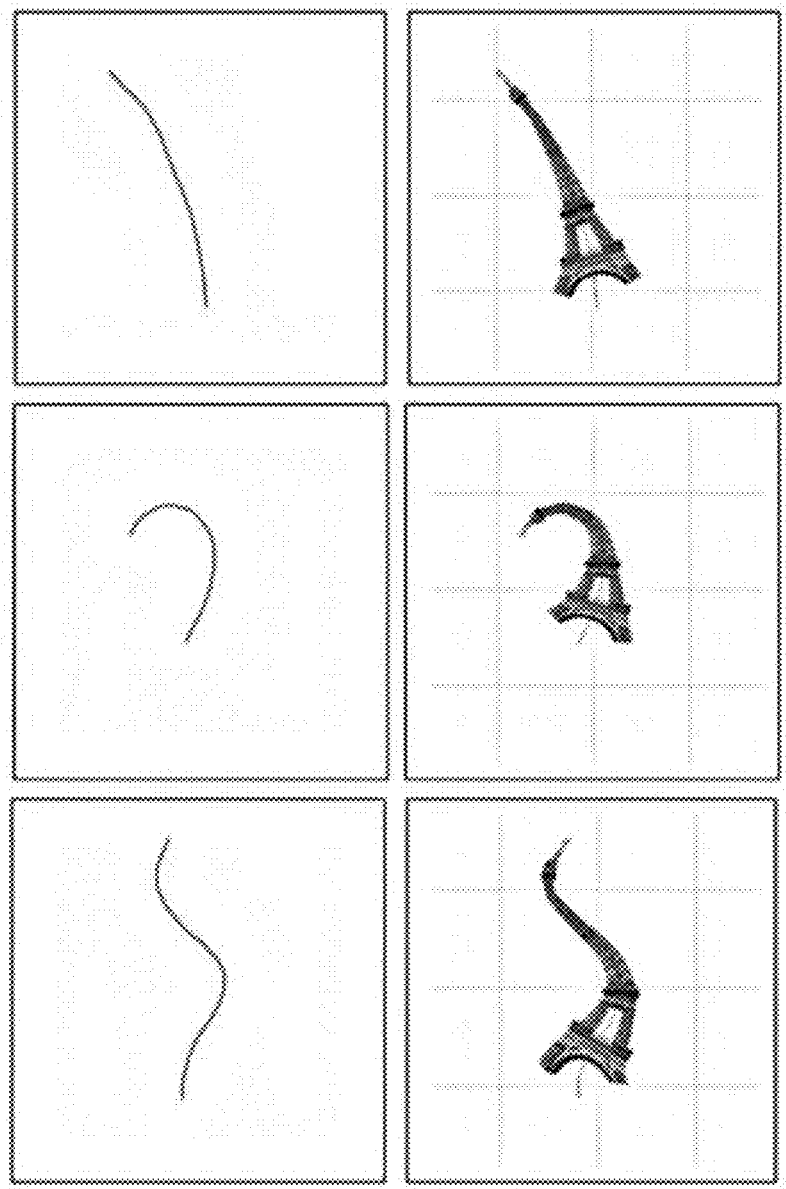

The image deformation method using the deformation axis according to the present exemplary embodiment may deform a shape through the intermediate shape with respect to each axis by combining a plurality of axes 92 and 93 as illustrated in FIG. 9. As illustrated in FIG. 10, the image deformation method may form an image having a shape according to an axis drawn by a user, instead of deforming the axis.

In an image deformation method according to another exemplary embodiment of the present invention, the image deformation operation S200 may deform an image by applying a linear blend skinning (LBS) to an image according to a deformed deformation image, instead of deforming the image using the intermediate shape as described above.

The LBS is also referred to as skeletal subspace deformation (SSD) and is an image deformation method that has been typically utilized for a skeleton based animation and a method of deforming a given shape according to an influence power of each skeleton. The LBS method enables an overlapping portion such as a joint to be smoothly deformed by appropriately mixing a weight of each point of the shape with respect to each skeleton.

Figure 12:
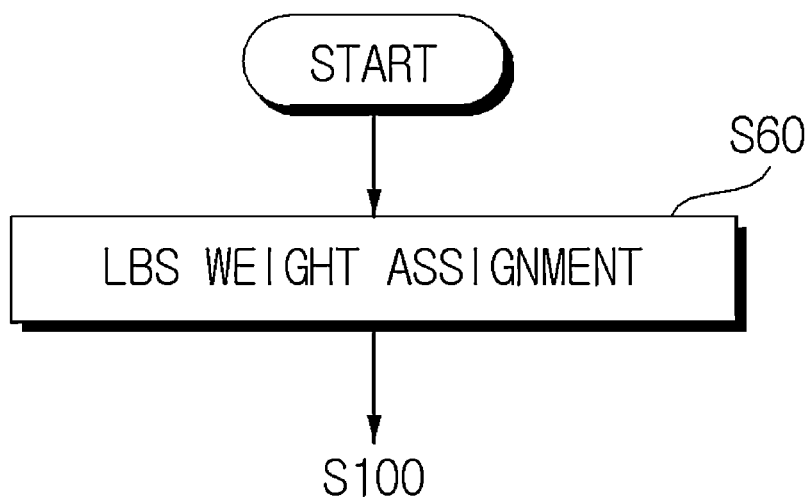
FIG. 12 is a flowchart illustrating a linear blend skinning (LBS) weight assignment operation in an image deformation method using a deformation axis according to another exemplary embodiment of the present invention.

According to an exemplary embodiment of the present invention, to apply the LBS to the image according to the deformed deformation axis, the aforementioned intermediate shape generation operation S50 of FIG. 3 is replaced with an LBS weight assignment operation S60 of FIG. 12. The LBS weight assignment operation S60 assigns an LBS weight to each portion of the deformation axis with respect to each point of the image and the image deformation operation S200 deforms the image according to the LBS weight of each point.

Figure 13:
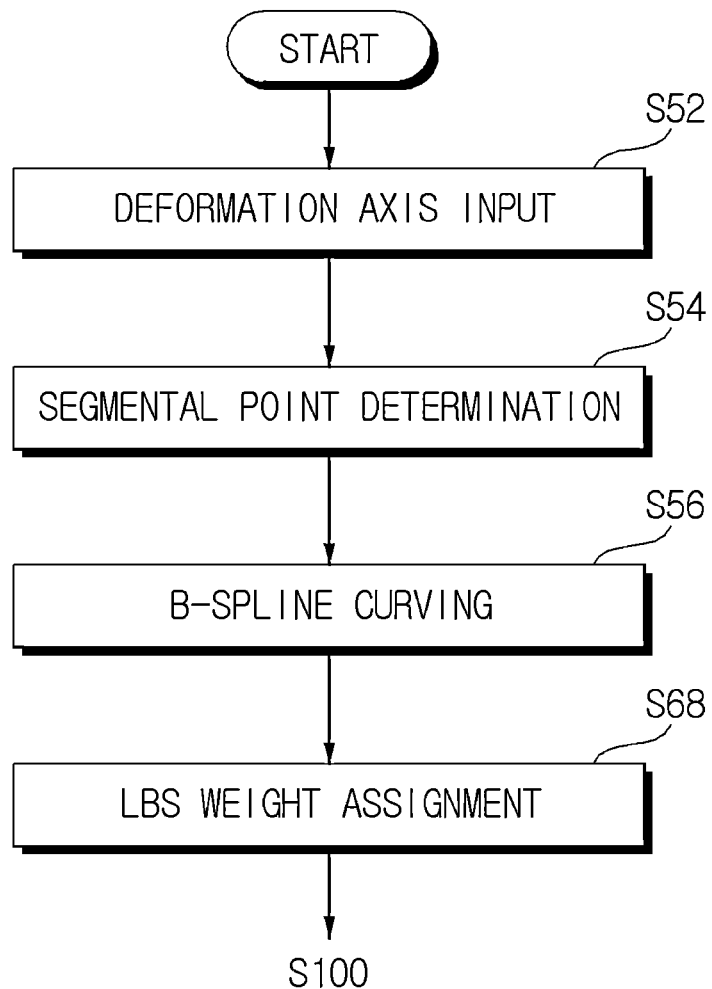
FIG. 13 is a flowchart illustrating in detail the LBS weight assignment operation in the image deformation method using the deformation axis according to another exemplary embodiment of the present invention.

FIG. 13 is a flowchart illustrating in detail the LBS weight assignment operation S60, and includes a deformation axis input operation S52, a segmental point determination operation S54, a B-spline curving operation S56, and an LBS weight assignment operation S68. The deformation axis input operation S52, the segmental point determination operation S54, and the B-spline curving operation S56 are the same as described above with reference to FIG. 4 and thus, a description relating thereto will be omitted.

The LBS weight assignment operation S68 assigns the LBS weight about each segment of the deformation axis with respect to each point of the image. To assign the LBS weight about each segment of the deformation axis with respect to each point of the image, a user may designate appropriate weight values and weight values may be automatically calculated. For example, a bounded biharmonic weights (BBW) method and the like may be used to automatically calculate the weight values.

Figure 14:
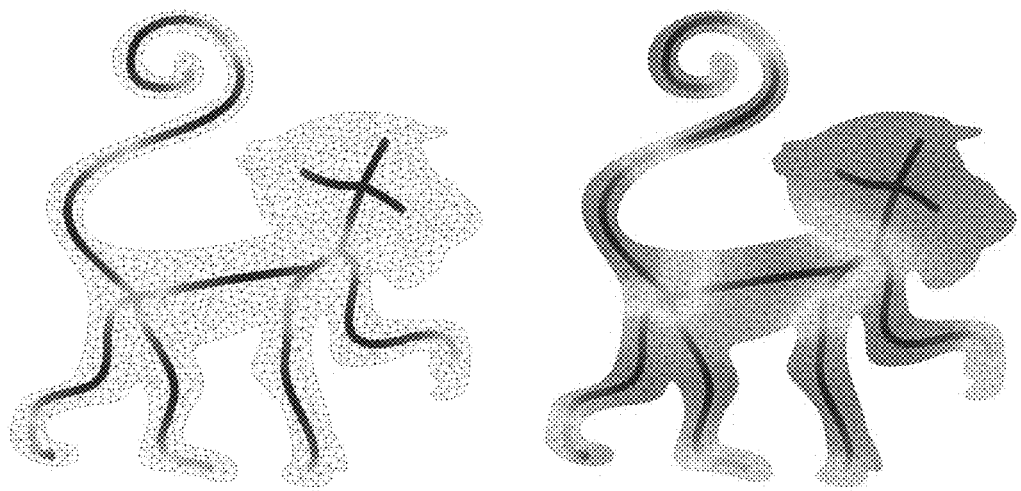
FIG. 14 illustrates an example of assigning a weight about each portion of a deformation axis by applying a bounded biharmonic weights (BBW) scheme to each point of an image.

FIG. 14 illustrates an example in which a weight about each portion of the deformation axis is assigned by applying a BBW method to each point of a monkey image. Referring to FIG. 13, whether each point of the image has a great weight compared to a predetermined portion of the deformation axis is expressed in colors. For example, as illustrated in FIG. 14, points of a torso have a great weight compared to a deformation axis of a torso side and points of an arm have a great value compared to a deformation axis of an arm side.

Hereinafter, an image deformation apparatus 10 for performing the image deformation method using the deformation axis according to an exemplary embodiment of the present invention will be described with reference to FIG. 11.

Figure 11:
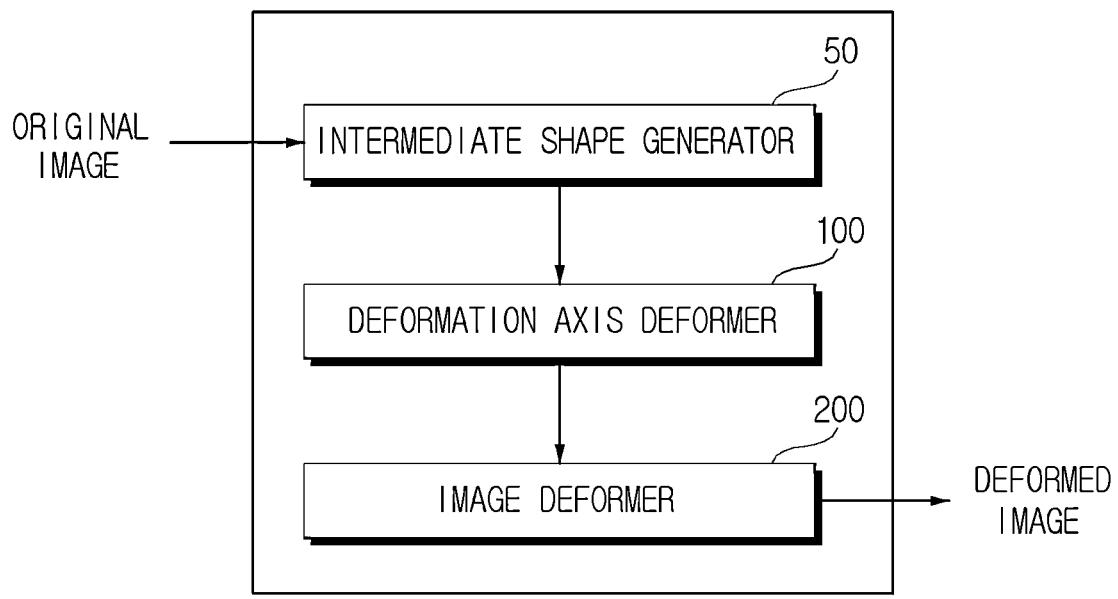
FIG. 11 is a block diagram illustrating an image deformation apparatus using a deformation axis according to an exemplary embodiment of the present invention.

Referring to FIG. 11, the image deformation apparatus 10 using the deformation axis according to the present exemplary embodiment includes an intermediate shape generator 50, a deformation axis deformer 100, and an image deformer 200.

The intermediate shape generator 50 generates an intermediate shape that uses the deformation axis as an axis (S50).

In the case of deforming an image, the deformation axis deformer 100 deforms the deformation axis based on deformation energy of points according to a deformation of at least one deformation axis including a plurality of points predetermined with respect to the image.

The image deformer 200 deforms the image using a plurality of segments of the deformation axis divided based on points of the deformation axis (S200). As described above, image deformation according to the present exemplary embodiment is performed through deforming the intermediate shape that uses the deformation axis as the axis, instead of deforming an image of an actual object.

The above each configuration is to perform an operation of the image deformation method using the deformation axis and the intermediate shape according to the aforementioned exemplary embodiment corresponding to each configuration and thus, a further detailed description relating thereto will be omitted.

Hereinafter, an image deformation apparatus 20 for performing the image deformation method using the deformation axis according to another exemplar embodiment of the present invention will be described with reference to FIG. 15.

Figure 15:
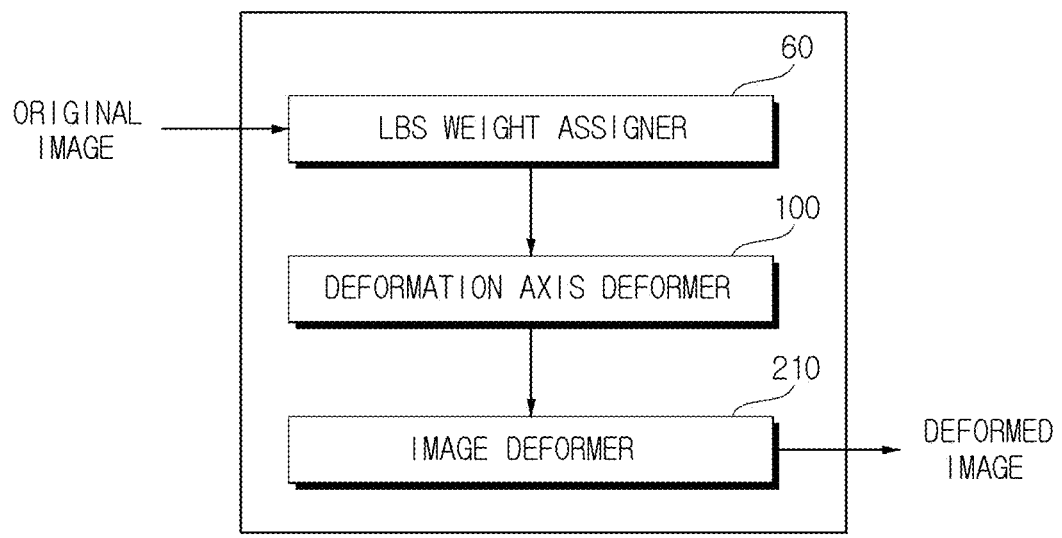
FIG. 15 is a block diagram illustrating an image deformation apparatus using a deformation axis according to another exemplary embodiment of the present invention.

Referring to FIG. 15, the image deformation apparatus 20 using the deformation axis according to the present exemplary embodiment includes an LBS weight assigner 60, a deformation axis deformer 100, and an image deformer 210.

The LBS weight assigner 60 assigns an LBS weight about each segment of the deformation axis with respect to each point of the image.

In the case of deforming the image, the deformation axis deformer 100 deforms the deformation axis based on deformation energy of points according to deformation of at least one deformation axis including a plurality of points predetermined with respect to the image.

The image deformer 210 deforms the image using the LBS weight of each point of the image according to the deformed deformation axis.

The above each configuration is to perform an operation of the image deformation method using the deformation axis and the LBS weight according to the aforementioned exemplary embodiment corresponding to each configuration and thus, a further detailed description relating thereto will be omitted.

Meanwhile, the image deformation method using the deformation axis of the present invention may be configured in a form of a computer-readable code in computer-readable media. The computer-readable media includes all the types of recording devices storing data readable by a computer system.

Examples of the computer-readable media may include ROM, RAM, CD-ROM, magnetic tapes, floppy disks, optical data storage devices, and the like. The computer-readable media may be distributed over a computer system connected through a network and thereby a computer readable code using a distributive scheme may be stored and executed. Functional programs, codes, and code segments for realizing the present invention may be easily inferred by programmers in the art.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An image deformation method using a deformation axis, the method comprising:
generating an intermediate shape, the intermediate shape including figures that are formed along at least one deformation axis and surround a portion of the deformation axis, the deformation axis including a plurality of points predetermined with respect to an image to be deformed;
deforming the deformation axis based on deformation energy of the plurality of points according to a deformation of the deformation axis, wherein the deformation energy is calculated using lengths of segments of the deformation axis divided based on the plurality of points, coordinates of a point on the deformation axis, and coordinates of neighboring points thereof, for considering a maintenance of the lengths of the segments; and
deforming the image using the segments of the deformation axis, and determining a thickness of the intermediate shape based on the lengths of the segments of the deformation axis by considering the maintenance of a width of the intermediate shape, wherein the deforming of the image deforms the image by deforming the intermediate shape.

2. The method of claim 1, wherein the deforming of the deformation axis comprises deforming the deformation axis based on the deformation energy of the plurality of points calculated using Laplacian coordinates about the plurality of points.

3. The method of claim 1, wherein the deforming of the deformation axis comprises deforming the deformation axis to minimize the deformation energy of the plurality of points in the case of deforming the image.

4. The method of claim 1, wherein the intermediate shape is configured as a plurality of offset curves having a predetermined interval with respect to the deformation axis.

5. The method of claim 1, wherein the intermediate shape includes a plurality of offset points that is positioned on a normal line with respect to the segments of the deformation axis and has a predetermined interval.

6. The method of claim 1, wherein the deforming of the image comprises deforming the intermediate shape based on a before-deformation width and an after-deformation width of the intermediate shape.

7. The method of claim 6, wherein the deforming of the image comprises determining the thickness of the intermediate shape that is deformed based on a change in the lengths of the segments of the deformation axis according to the deformation of the intermediate shape.

8. The method of claim 1, wherein the deformation of the image is performed based on a change in a position of a rotation control point using a fixing control point or the rotation control point set with respect to the deformation axis.

9. The method of claim 1, wherein the deforming of the image comprises deforming the image using a linear blend skinning (LBS) weight assigned to each segment of the deformation axis with respect to each point of the image.

10. The method of claim 9, further comprising:
assigning the LBS weight to each segment of the deformation axis with respect to each point of the image.

11. The method of claim 10, wherein the assigning of the LBS weight comprises assigning the LBS weight using a bounded biharmonic weights (BBW) scheme.

12. An image deformation method using a deformation axis, the method comprising:
receiving, from a user, a reference axis that is a reference of image deformation;
generating an intermediate shape, the intermediate shape including figures that are formed along a deformation axis and surround a portion of the deformation axis, the deformation axis including a plurality of points predetermined with respect to an image according to the reference axis;
deforming the deformation axis based on deformation energy of the plurality of points in the case of deforming the deformation axis, wherein the deformation energy is calculated using lengths of segments of the deformation axis divided based on the plurality of points, coordinates of a point on the deformation axis, and coordinates of neighboring points thereof, for considering a maintenance of the lengths of the segments; and
deforming the image using the segments of the deformation axis, and determining a thickness of the intermediate shape based on the lengths of the segments of the deformation axis by considering the maintenance of a width of the intermediate shape, wherein the deforming of the image deforms the image by deforming the intermediate shape.

13. An image deformation apparatus using a deformation axis, the apparatus comprising:
a processor configured to:
generate an intermediate shape, the intermediate shape including figures that are formed along at least one deformation axis and surround a portion of the deformation axis, the deformation axis including a plurality of points predetermined with respect to an image to be deformed;
deform the deformation axis based on deformation energy of the plurality of points according to a deformation of the deformation axis, wherein the deformation energy is calculated using lengths of segments of the deformation axis divided based on the plurality of points, coordinates of a point on the deformation axis, and coordinates of neighboring points thereof, for considering a maintenance of the lengths of the segments;
deform the image through deforming the intermediate shape using the segments of the deformation axis; and
determine a thickness of the intermediate shape based on the lengths of the segments of the deformation axis by considering the maintenance of a width of the intermediate shape,
wherein the deforming of the image deforms the image by deforming the intermediate shape.

14. The apparatus of claim 13, wherein the processor deforms the deformation axis based on the deformation energy of the plurality of points calculated using Laplacian coordinates about the plurality of points.

15. The apparatus of claim 13, wherein the processor deforms the deformation axis to minimize the deformation energy of the plurality of points in the case of deforming the image.

16. The apparatus of claim 13, wherein the intermediate shape is configured as a plurality of offset curves having a predetermined interval with respect to the deformation axis.

17. The apparatus of claim 16, wherein the intermediate shape includes a plurality of offset points that is positioned on a normal line with respect to the segments of the deformation axis and has a predetermined interval.

18. The apparatus of claim 16, wherein the processor deforms the intermediate shape based on a before-deformation width and an after-deformation width of the intermediate shape.

19. The apparatus of claim 18, wherein the processor determines the thickness of the intermediate shape that is deformed based on a change in the lengths of the segments of the deformation axis according to the deformation of the intermediate shape.

20. The apparatus of claim 13, wherein the deformation of the image is performed based on a change in a position of a rotation control point using a fixing control point or the rotation control point set with respect to the deformation axis.

21. The apparatus of claim 13, wherein the processor deforms the image using an LBS weight assigned to each segment of the deformation axis with respect to each point of the image.

22. The apparatus of claim 21, wherein the processor is configured to:
    assign the LBS weight to each segment of the deformation axis with respect to each point of the image.

23. The apparatus of claim 22, wherein the processor assigns the LBS weight using a BBW scheme.

\* \* \* \* \*